United States Patent [19]

Zimmerman et al.

[11] Patent Number: 4,690,502

[45] Date of Patent: Sep. 1, 1987

[54] ULTRAVIOLET CURABLE OPTICAL GLASS FIBER COATINGS FROM ACRYLATE TERMINATED, END-BRANCHED POLYURETHANE POLYUREA OLIGOMERS

[75] Inventors: John M. Zimmerman, Schaumburg; Timothy E. Bishop, Algonquin, both of Ill.

[73] Assignee: DeSoto, Inc., Des Plaines, Ill.

[21] Appl. No.: 752,583

[22] Filed: Jul. 8, 1985

[51] Int. Cl.$^4$ .......................... C08F 2/50; C08F 26/02; C08F 126/02; G02B 6/22

[52] U.S. Cl. ............................... 350/96.29; 350/96.33; 428/378; 522/96; 522/97; 526/301

[58] Field of Search .................. 522/92 VS, 97, 96; 528/75; 350/96.29, 96.33; 526/301

[56] References Cited

U.S. PATENT DOCUMENTS

| | | | |
|---|---|---|---|
| 3,864,133 | 2/1975 | Hisamatsu | 430/284 |
| 3,891,523 | 6/1975 | Hisamatsu | 525/455 |
| 4,097,439 | 6/1978 | Darling | 525/455 |
| 4,320,220 | 3/1982 | Pampouchidis | 524/555 |
| 4,458,007 | 7/1984 | Geissler | 528/75 |
| 4,472,019 | 9/1984 | Bishop | 522/92 |
| 4,485,229 | 11/1984 | Waddill | 528/407 |
| 4,495,271 | 1/1985 | Geissler | 430/275 |
| 4,590,250 | 5/1986 | Ansel | 526/301 |
| 4,608,409 | 8/1986 | Coady | 526/301 |
| 4,609,718 | 9/1986 | Bishop | 526/301 |

Primary Examiner—John C. Bleutge
Assistant Examiner—A. H. Koeckert
Attorney, Agent, or Firm—Dressler, Goldsmith, Shore, Sutker & Milnamow, Ltd.

[57] ABSTRACT

Ultraviolet curing oligomers and liquid coating compositions based thereon are disclosed which cure with ultraviolet light in the presence of a photoinitiator. The coating compositions can provide either a single coating for optical glass fiber which resists microbending difficulties down to around −40° C., or a topcoat for overcoating softer buffer coatings which resist microbending down to around −60° C. The coating compositions consist essentially of the linear polyacrylate-terminated polyurethane polyurea oligomer in admixture with an ultraviolet curable liquid acrylate or polyacrylate to provide the liquidity needed for application and to adjust the hardness or softness of the cured coating for the selected single coat or topcoat utility. The linear polyacrylate-terminated polyurethane polyurea oligomer comprises a linear polyurethane terminated with an essentially monohydric adduct of low molecular weight diprimary amine with from about 1 to about 2.5 moles of monoepoxide per mole of diamine and reacted with a monohydric acrylate to leave about 1 hydroxy group per molecule. The several acrylate terminal groups increases the toughness and the cure speed.

27 Claims, No Drawings

ULTRAVIOLET CURABLE OPTICAL GLASS FIBER COATINGS FROM ACRYLATE TERMINATED, END-BRANCHED POLYURETHANE POLYUREA OLIGOMERS

DESCRIPTION

1. Technical Field

This invention relates to ultraviolet curable coating compositions based on linear oligomers which have a plurality of terminal acrylate-functional branches which increase toughness and speed the ultraviolet cure, and includes the new oligomers. These compositions may be employed either as a single coating applied directly to the optical fiber, or as an overcoating on buffer coating optical fiber to improve the physical properties of the coated fiber.

2. Background Art

Optical glass fiber must be coated to protect its surface against abrasion. Since heat-cured coatings are slow curing, it has been desired to employ ultraviolet-curing coating compositions. This proved to be difficult in practice because the optical fiber must be expected to encounter a wide range of service temperatures, including very low service temperatures. The usual ultraviolet-cured coatings are either too hard initially, or become too hard at the lower service temperatures. This excessive hardness causes the difference between the thermal coefficient of expansion of the coating and the thermal coefficient of expansion of the glass to produce microbends in the fiber when low service temperatures are encountered. These microbends interface with the capacity of the fiber to convey optical messages.

Industry experienced great difficulty in providing ultraviolent curing coatings which would have enough strength at room or expected elevated service temperature to protect the glass surface against mechanical stress without inducing microbending difficulties at low service temperature until R. E. Ansel, Ser. No. 170,148 filed July 18, 1980, now U.S. Pat. No. 4,624,994, found that certain urethane oligomer diacrylates could be combined with appropriate mixtures of monoethylenically unsaturated monomers including a large proportion of a monomer of low glass transition temperature to provide a primer or buffer coating which could then be overcoated with a stronger and harder topcoat to provide the combination of properties which was needed.

Unfortunately, the coatings disclosed in the aforesaid Ansel application are only able to resist temperatures down to around −40° C., and they require overcoating. While other ultraviolet-cured coatings have better low temperature properties have been found, these are softer at room temperature, and thus more in need of overcoating.

Accordingly, one objective of this invention is to provide ultraviolet-curable coatings which combine reasonably good low temperature microbending resistance with sufficient room temperature strength to be useful in the absence of topcoating.

Optical fibers not only encounter low service temperatures, but they also encounter elevated service temperatures. Those coatings which provide good low temperature characteristics are frequently much too soft at room or elevated service temperature, and thus must be topcoated. It has therefore been found desirable to topcoat a buffer coating optical glass fiber with a tough and flexible overcoat possessing superior resistance to moisture and abrasion. To obtain the desired properties in optical glass fibers which have been buffer coated, resort has been had to the use of extruded Nylon "jacket" coatings, but these are more expensive and difficult to apply than ultraviolet-cured coatings.

It is also known to apply both the buffer coating and the topcoating at high speed using an ultraviolet-curable topcoat on top of a buffer coating which has been ultraviolet cured, but the ultraviolet-cured topcoats have not possessed the desired strength and resistance to rupture without being inadequately flexible.

Another objective of this invention is to provide ultraviolet-curable topcoatings which will substantially duplicate the properties now obtained using the extruded "jacket" coatings noted above so that high speed coating procedures can be used to economically produce buffer coated and topcoated optical glass fiber which will satisfy the demanding commercial requirements which are insisted upon.

DISCLOSURE OF INVENTION

In accordance with this invention, an ultraviolet curing liquid coating composition is provided which, when cured with ultraviolet light in the present of a photoinitiator, provides a single coating for optical glass fiber having adequate strength at room or expected elevated temperature (and is stable at such elevated temperature) and which can resist microbending difficulties down to around −40° C., or which can be used to overcoat softer buffer coatings which can remain soft to resist microbending difficulties down to around −60° C. This coating composition consists essentially of a linear polyacrylate-terminated polyurethane polyurea oligomer comprising a linear polyurethane which is terminated with an essentially monohydric adduct of a low molecular weight diprimary amine and a monoepoxide which has been prereacted with an acrylate-functional monoisocyanate, the polyacrylate oligomer being used in admixture with an ultraviolet curable liquid acrylate and polyacrylate to provide the liquidity needed for application and to adjust the hardness or softness of the cured coating for the selected single coat or topcoat utility. The invention includes the new linear oligomers with their branched extremities.

The combination of the linear oligomer structure and the large numbere of acrylate-terminated branches at the ends of the linear structure increases the hardness and strength of the cured coating, and it also considerably speeds the cure which is a vital aspect of the practical coating of optical glass fiber.

Suitable diprimary amines which may be used may vary considerably, so long as the molecular weight of the diprimary amine does not exceed about 500. Thus, one may use butylene diamine, or hexylene diamine, but it is preferred to use polyoxypropylenes with terminal primary amine groups. Texaco, Inc. of Houston, Tex. provides a diamine based on propylene oxide which contains an average of 2.7 propylene oxide groups per molecule, this diamine being available under the trade designation Jeffamine HPD 232. This product will be used herein as illustrative.

The diamine is reacted with a monoepoxide, the preferred monoepoxides being ethylene oxide, propylene oxide and butylene oxide. Propylene oxide is presently preferred and will be used as illustrative. From about 1 to about 2.5 moles of monoepoxide are used per mole of the diameter. When less than 1 mol of monoepoxide is used, unreacted diamine remains, and it can be regarded as just another difunctional component of the linear polyurethane polyurea which will later be formed. More than 2.5 moles of monepoxide tends to produce gel particles, and this is undesirable. In preferred practice, from 1.1 to 2.0 moles of monoepoxide are used per mole of diamine, and about 1.4 is preferred and will be illustrated.

As will be understood, the reaction of the oxirane group of the monoepoxide is with the amino hydrogen atoms, the primary amino hydrogen atoms being preferential, perhaps because the second amino hydrogen is sterically hindered. In any event, the product contains one hydroxy group for each molar proportion of monoepoxide used, and it also contains amino hydrogen atoms.

Amine groups are monofunctional with respect to isocyanate functionality, so since subsequent reaction is with such functionality, this should be kept in mind.

The diamine-monoepoxide adduct is then reacted with an acrylate-functional monoisocyanate, these being easily formed by reacting equimolar proportions of a monohydric acrylate with a diisocyanate. This reaction is particularly easy to carry out using a diisocyanate having one isocyanate group which is more reactive than the other, such as isophorone diiscoyanate. Any monohydric acrylate can be used, 2-hydroxyethyl acrylate being presently preferred and used as illustrative.

The acrylate-functional monoisocyanate is now reacted with the diamine-monoepoxide adduct, and the isocyanate functionality reacts perferentially with the amino hydrogens present. Enough of the monoisocyanate is used to consume all the amine functionality and to also consume all but one hydroxy functionality. The remaining hydroxy functionality is well distributed so that most of it is present as one hydroxy group per molecule of polyacrylate-functional product. When this monohydric polyacrylate is used in the formation of the polyurethane oligomer, that oligomer can be described as terminated with an essentially monohydric adduct of a low molecular weight diprimary amine and a monoepoxide which has been prereacted with an acrylate-functional monoisocyanate.

As previously indicated, the polyurethane, polyurea oligomer comprises a linear polyurethane, and this is made by the reaction of difunctional components which includes diisocyanates, typified by isophorone diisocyanate, diols, such as polyoxypropylene glycol, or diamines, such as those used to form the diamine-monoepoxide reaction products. This linear polyurethane may be formed first as an isocyanate-terminated linear prepolymer which is then reacted with the monohydric diamine-monoepoxide polyacrylate, or all of the components including the monohydric diamine-monoepoxide polyacrylate may be reacted together at the same time. Since this polyacrylate contains one hydroxy group as essentially the only isocyanate-reactive group, it serves as a chain stopper and automatically assumes a terminal position.

The preferred linear polyacrylate-terminated polyurethane polyurea oligomers which are used herein have a molecular weight of about 1000 to about 8000 with one linking group selected from urethane or urea groups for every 200 to 900 units of weight.

In the preferred coating compositions, the polyacrylate oligomer should constitute at least about 30% of the reactive components in the coating, preferably at least about 40%. As a practical matter, the polyacrylate oligomer will not exceed about 80% of the coating composition, preferably not more than 70%.

The properties needed for single coat application are a tensile modulus less than about 15,000 and the capacity to resist microbending down to about $-40°$ C. The properties needed in an ultraviolet-curable topcoating composition can be identified lby reference to the testing of a 3 mil test film peeled from a glass support on which it was formed and cured by ultraviolet exposure. The film should possess a tensile strength of at least 2000 psi. in combination with a room temperature (25° C.) tensile modulus of at least 50,000 psi. to identify proper performance for topcoat application. Prior ultraviolet-cured coatings having this considerable strength lacked desired flexibility, evidence by an elongation of less than 20%.

Previous efforts at our laboratory to provide appropriate ultraviolet-curing topcoating compositions have been successful, but those compositions must include acrylic acid to have reasonable ultraviolet cure speed, and even then the cure speed obtained in this invention is better than the prior compositions containing acrylic acid.

The buffer coatings which may be overcoated will vary considerably, but these are characterized by a relatively low tensile modulus at room temperature. It is because the buffer coating on the optical glass fiber has a room temperature modulus below about 1000 psi, that overcoating becomes important.

Referring more particularly to the ultraviolet curable liquid acrylate or polyacrylate which provides the liquidity needed for application and to adjust the hardness or softness of the cured coating for the selected single coat or topcoat utility, these may be monoacrylates or polyacrylates, as desired. Both of these are well known to provide the viscosity needed for coating application, albeit some are better than others for providing desired curing speed and/or desired softness or hardness.

Thus, when hardness is desired, one will employ a proporton of a polyacrylate having a molecular weight below about 600, such as pentaerythritol triacrylate or trimethylol propane triacrylate. These will be used either alone or together with acrylate-functional monomers of high glass transition temperature, such as dimethyl acrylamide. On the other hand, when softness is desired, one will normally use a monoacrylate having a low glass transition temperature, several of which will be mentioned hereinafter. When high cure speed is desired together with softness, one may use a relatively high molecular weight liquid linear aliphatic diacrylate in which the two acrylate groups are separated by a linear chain containing at least 6 carbon atoms, or where less than 6 carbon atoms are present in the chain, that chain is a part of a polyether or similar oligomer having a molecular weight of from 400 to about 4000, preferably from 600 to 2500. These will be further described hereinafter.

The molecular weights of reactive materials is routinely calculated from the known formula and the measured reactivity, and this molecular weight designation will be used unless otherwise specified.

The use of low molecular weight liquid polyacrylates to harden ultraviolet curing coating compositions is well known, as has been illustrated.

Many acrylate-functional monomers of high glass transition temperature are known for inclusion in radiation-curable coating compositions. These are generally monomers having a glass transition temperature above about 55° C., and are further illustrated by N-vinyl pyrrolidine, isobornyl acrylate acrylic acid and dicyclopentenyl acrylate. These all render the composition more fluid, which aids application. It is preferred not to use more than 45% of acrylate-functional monomer to avoid excessive fluidity. The N-vinyl pyrrolidone noted above is unusually reactive despite its lack of an acrylate group, and it is considered to be an equivalent of an acrylate-functional compound.

The most rapid curing of the above named monomers is acrylic acid, and it has an offensive odor, irritates skin and eyes, corrodes metals, and introduces water sensitivity. In this invention we obtain high cure speed in the absence of acrylic acid.

Acrylate-functional monomers havin a low glass transition temperature, e.g., less than 0° C., preferably less than −20° C., provide softness for single coat use. The glass transition temperature is measured on a homopolymer of the monomer. Low glass transition temperature acrylate monomers which may be used are ethoxyethoxyethyl acrylate, phenoxyethyl acrylate, dimethylaminoethyl acrylate, butoxyethyl acrylate, 2-hydroxyethyl acrylate, and tetrahydro furfuryl acrylate.

In addition to the monoacrylates noted previously, one may include a proportion of a polyacrylate to provide toughness, these including trimethylol propane triacrylate and glyceryl propoxy triacrylate containing three molar proportions of adducted propylene oxide. Also, one may use trimethylol propane reacted with beta-carboxyethyl acrylate.

To illustrate liquid polyacrylates which may be used for single coat application, reference is made to liquid linear aliphatic diacrylates in which the two acrylate groups are separated by a molecular weight of at least 400 up to about 4000. Suitable diacrylates for single coat use have a molecular weight of from 600 to 2500 and the two acrylate groups are desirably separated by a polyoxybutylene structure. The preferred polyoxybutylene glycol diacrylates have a molecular weight of from 800 to 2000. Other liquid linear aliphatic diacrylates which may be used are 1,12-dodecyl diacrylate and the reaction product of 2 moles of acrylic acid with one mole of dimer fatty alcohol, these normally having 36 carbon atoms.

Commercially available liquid linear aliphatic diacrylates which may be used are Chemlink products 9000 and 9001 as well as 2000.

The compositions of this invention normally have an index of refraction above 1.48, and this is preferred for the single coating of optical glass fiber, and they can also resist microbending down to around −40° C.

When single coat application is intended, one may elect to introduce desired softness into the polyacrylate-terminated oligomer by employing an organic diisocyanate in which a linear aliphatic chain containing at least 6 carbon atoms separates the two isocyanate groups, and this diisocyanate is reacted with a dihydric polyether or polyester contaning alkylene groups having from 1 to 6 carbon atoms and a molecular weight in the range of 500 to 4000, to form a polyurethane diisocyanate which is then completed to provide the polyacrylate-terminated branched structure which characterizes this invention.

The separation of the two isocyanate groups may include other groups in addition to the long carbon chain. Thus, dimer fatty acids may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion, and the resulting diamine can be reacted with excess diisocyanate to provide a diisocyanate.

The diisocyanates, including the above long chain aliphatic diisocyanate are reacted with a dihydric polyether or polyester, preferably containing alkylene groups having from 1 to 6 carbon atoms (preferably 3 or 4 carbon atoms) and a molecular weight in the range of 500 to 4000. These are illustrated by polyoxyethylene glycol having a molecular weight of 1500, 2000 or 2500, polyoxypropylene glycol of corresponding molecular weight, and polytetramethylene glycol of molecular weight 1000. Polyoxyethylated or polyoxypropylated diols, such as butane diol, hexane diol, polyoxyethylene glycol or polyoxypropylene glycol, are also useful.

Polyesters which may be used are illustrated by polycaprolactone glycols, such as the commercially available Tone 0240 from Union Carbide Corporation which is a polycaprolactone glycol having a molecular weight of about 2000.

The preparation of the linear polyacrylate-terminated polyurethane polyurea oligomers may vary as noted previously, and is illustrated as follows.

First, it is convenient to prepare an acrylate-functional monoisocyanate, and this is done by reacting a monohydric acrylate with one molar proportion of an organic diisocyanate. This provides a capping agent which is reactive with active hydrogen atoms regardless of whether they are amino hydrogen atoms or carried by an hydroxyl group.

Second, one prepares the diamine-monoepoxide adduct. The reaction of monoepoxide, like propylene oxide, with amine functionality is itself well known and straightforward. Using the preferred porportion of 1.4 moles of propylene oxide per mole of diamine, the reaction proceeds easily at moderate temperature until all of the oxirane groups have been consumed in the productin of an amine-functional product containing one hydroxy group for each oxide molecule used. In the described reaction, the product contains, with respect to isocyanate functionality, 2 amine functionalities and 1.4 hydroxy functionalities.

Third, the acrylate-functional monoisocyanate produced in the first step is reacted with the diamine-monoepoxide adduct produced in the second step, the amount used being sufficient to consume all the amine functionality and all but one of the hydroxy groups. In the situation here used as illustrative, 2.4 molar proportions of acrylate-functional monoisocyanate are used per mole of diamine-monoepoxide adduct, and the reaction is carried out at moderate temperature in the presence of a trace of dibutyl tin dilaurate catalyst, which is well known to accelerate the isocyanate-hydroxy urethane-forming reaction. The reaction with amino hydrogen produces urea groups.

The product of the above reaction is a monohydric polyacrylate containing about 2.4 acrylate groups per molecule.

Fourth, two moles of diisocyanate are mixed with 1 mole of diol, diamine or mixture thereof, and 2 moles of the monohydric polyacrylate produced in the third step. The same reactions used in step three now serve to produce a linear polyurethane containing urea groups and a plurality of acrylate groups at each end of the linear oligomer.

Any monohydric acrylate may be used, typically 2-hydroxyethyl acrylate. 2-hydroxypropyl acrylate and 2-hydroxybutyl acrylate are also useful. Trimethylol propane diacrylate or pentaerythritol triacrylate will further illustrate the class of useful monohydric alcohols, but here the large number of desired terminal acrylate groups is provided by the monohydric polyacrylate, so the monohydric monoacrylates are preferred.

While diols are presently preferred, one may employ $C_1$ to $C_4$ oxyalkylene diamine in the polyurethane oligomer used herein, thus forming more urea groups which are particularly desired when the coatings are used as a topcoat. These diamines have a molecular weight of from 100 to 6000. Typical diamines are amine-terminated polyethers, such as polyoxyethylene, or preferably polyoxypropylene, with the polyether chain providing the bulk of the needed molecular weight. These are specifically illustrated by polyoxypropylene diamine of molecular weight 200, 400 and 2000, and by polyoxyethylene diamine of molecular weight 600.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. Benzophenone is quite effective in this invention, but it is presently preferred to use dimethoxyphenyl acetophenone which is available in commerce under the trade designation Irgacure 651 from Ciba-Geigy, Ardsley, N.Y. These photoinitiators may be used alone or in admixture with one another, and amines, like diethyl amine, can be added as photosensitizer, though this is not normally needed.

The coating compositions of this invention are normally free of volatile organic solvents since these would have to be evaporated before untraviolet exposure, which would slow the curing system.

To avoid any question, the terms "acrylate" and "polyacrylate" are used in their accepted sense of denoting an acrylic acid ester group.

Throughout this description and also in the claims, all porportions are by weight. The invention is illustrated as follows.

EXAMPLE 1

First, one mole of 2-hydroxyethyl acrylate is adducted in conventional fashion with one mole of isophorone diisocyanate to provide the acrylate monoisocyanate.

Second, the acrylate-functional monoisocyanate produced in the first step is reacted with a partially propoxylated amine adduct available from Texaco Inc., Houston, Tex., as Jeffamine HPD 232. This amine adduct contains 1.4 hydroxy equivalents and 2.0 amine equivalents. This is accomplished using 2.4 equivalents of isocyanate in the acrylate monoisocyanate so that the amount used is sufficient to consume all the amine functionality and all but one of the hydroxy groups. The reaction is carried out at 60° C. in the presence of 0.05% of dibutyl tin dilaurate catalyst.

The product of the above reaction is a monohydric polyacrylate containing about 2.4 acrylate groups per molecule.

Third, two moles of isophorone diisocyanate are mixed with 1 mole of polyoxypropylene glycol having a molecular weight of about 1000, and 2 moles of the monohydric polyacrylate produced in the third step. The same reaction conditions used in step three now serve to produce a linear polyurethane oligomer containing urea groups and a plurality of acrylate groups at each end of the linear oligomer, phenoxyethyl acrylate being used to maintain liquidity. In the previous steps, sufficient phenoxyethyl acrylate is always present to maintain the reaction medium as an easily stirrable liquid at reaction temperature, and as a result, the final product contains 35% of phenoxyethyl acrylate. The final product is an acrylate-functional linear polyurethane polyurea oligomer in solution in phenoxyethyl acrylate.

EXAMPLE 2

72.0 parts of the solution product of Example 1 is mixed with 25.0 parts of isobornyl acrylate and 3.0 parts of dimethoxyphenyl acetophenone. The product was a clear, straw-colored liquid having a viscosity of 9640 centipoises. On application to a glass surface and curing with ultraviolet light to provide a cured film having a thickness of 3.0 mil which is removed from the glass and tested, it was found that the tensile strength was 2700 psi, the elongation at room temperature was 62%, the tensile modulus at room temperature was 89,000 psi, and the rupture strength was 2700. The cure speed was rapid, as indicated by the fact that methyl ethyl ketone extraction following cure with only 0.05 Joule per square centimeter of ultraviolet light produced 72% insolubilization.

EXAMPLE 3

The coatings of this invention are applied to freshly drawn optical glass fiber having a diameter of about 125 microns and which had been buffer coated with a very soft buffer coating and cured with ultraviolet light in a thickness of about 125 microns. This buffer coated fiber was then topcoated with the coating composition of Example 2 in a thickness of about 125 microns and cured by passing the coated fiber through two tandemly arranged 10 inch 300 watts medium pressure mercury vapor lamps at 1.5 meters per second.

The topcoat was well cured and well adapted to protect the buffer coated optical fiber.

What is claimed is:

1. A ultraviolet curing liquid coating composition which, when cured with ultraviolet light in the presence of a photoinitiator, either provides a single coating for optical glass fiber having adequate strength at room or expected elevated temperature, and a low tensile modulus which remains low to resist microbending difficulties down to around −40° C., or which can be used to overcoat softer buffer coatings which remain soft to resist microbending difficulties down to around −60° C., said coating composition consisting essentially of a linear polyacrylate-terminated polyurethane polyurea oligomer comprising a linear polyurethane terminated with an essentially monohydric adduct of low molecular weight diprimary amine with from about 1 to about 2.5 moles of monoepoxide per mole of diamine and reacted with acrylate-functional monoisocyanate to leave about 1 hydroxy group per molecule, and an ultraviolet curable liquid acrylate or polyacrylate to provide the liquidity needed for application and to adjust the hardness or softness of the cured coating for the selected single coat or topcoat utility.

2. A coating composition as recited in claim 1 in which said polyacrylate-terminated oligomer constitutes at least about 30% up to about 80% of the reactive components in the coating.

3. A coating composition as recited in claim 1 in which said polyacrylate-terminated oligomer constitutes at least about 40% up to about 70% of the reactive comonents in the coating.

4. A coating composition as recited in claim 1 adapted for topcoat application in which said ultraviolet curable liquid comprises an acrylate-functional monomer whose homopolymer has a glass transition temperature above about 55° C. in the absence of acrylic acid.

5. A coating composition as recited in claim 1 adapted for topcoat application in which said ultraviolet curable liquid comprises a polyacrylate having a molecular weight below about 600.

6. A coating composition as recited in claim 1 adapted for single coat application in which said ultraviolet curable liquid comprises an acrylate-functional monomer whose homopolymer has a glass transition temperature less than 0° C.

7. A coating composition as recited in claim 1 adapted for single coat application in which said ultraviolet curable liquid comprises an acrylate-functional monomer whose homopolymer has a glass transition temperature less than −20° C.

8. A coating composition as recited in claim 1 adapted for single coat application in which said ultraviolet curable liquid comprises a liquid linear aliphatic diacrylate in which the two acrylate groups are separated by at least a chain of 6 carbon atoms or by a molecular weight of at least 400 up to about 4000.

9. A coating composition as recited in claim 8 in which said two acrylate groups are separated by a molecular weight of from 600 to 2500.

10. A coating composition as recited in claim 9 in which said two acrylate groups are separated by a polyoxybutylene structure.

11. A coating composition as recited in claim 8 in which said linear liquid diacrylate is a polyoxybutylene glycol diacrylate having a molecular weight of from 800 to 2000.

12. A coating composition as recited in claim 1 in which said polyacrylate-terminated polyurethane oligomer has a molecular weight of about 1000 to about 8000 with one linking group selected from urethane and urea groups for every 200 to 900 units of weight.

13. A coating composition as recited in claim 1 in which said polyacrylate-terminated polyurethane polyurea oligomer is formed using diisocoyanate in which a linear aliphatic chain containing at least 6 carbon atoms separates the two isocyanate groups, and this diisocyanate is reacted with a polyether or polyester containing alkylene groups having from 1 to 6 carbon atoms and a molecular weight in the range of 500 to 4000, to form a polyurethane diisocyanate.

14. A coating composition as recited in claim 13 in which said diisocyanate is provided by dimer fatty acid diisocyanate.

15. A coating composition as recited in claims 14 in which said dimer fatty acid diisocyanate contains 36 carbon atoms.

16. A coating composition as recited in claim 14 in which said diisocyanate is reacted with a polyether which is a polyoxyalkylene glycol having a molecular weight in the range of 1000 to 3000.

17. A coating composition as recited in claim 16 in which said oxyalkylene glycol contains 3 or 4 carbon atoms.

18. A coating composition as recited in claim 1 in which said monohydric acrylate is 2-hydroxyethyl acrylate.

19. A linear polyacrylate-terminated polyurethane polyurea oligomer which contains a linear polyurethane terminated with an essentially monohydric adduct of low molecular weight diprimary amine with from about 1 to about 2.5 moles of monoepoxide per mole of diamine and reacted with a monohydric acrylate to leave about 1 hydroxy group per molecule.

20. An oligomer as recited in claim 19 in which said monoepoxide is an oxide containing from 2-4 carbon atoms and is used in an amount of from 1.1 to 2.0 moles per mole of diamine.

21. An oligomer as recited in claim 20 in which said diamine is a polyoxypropylene diamine and said monoepoxide is 1,2-propylene oxide.

22. An oligomer as recited in claim 21 in which said monoepoxide is used in an amount of about 1.4 moles per mole of the diamine.

23. An oligomer as recited in claim 19 in which said polyacrylate-terminated polyurethane oligomer has a molecular weight of about 1000 to about 8000 with one linking group selected from urethane and urea groups for every 200 to 900 units of weight.

24. An optical glass fiber single coated with an ultraviolet-cured coating of the composition of claim 6.

25. An optical glass fiber single coated with an ultraviolet-cured coating of the composition of claim 8.

26. An optical glass fiber topcoated with an ultraviolet-cured coating of the composition of claim 4.

27. An optical glass fiber topcoated with an ultraviolet-cured coating of the composition of claim 5.

* * * * *